United States Patent
Shafer et al.

(10) Patent No.: US 9,007,379 B1
(45) Date of Patent: Apr. 14, 2015

(54) METHODS AND APPARATUS FOR INTERACTIVE USER CONTROL OF VIRTUAL CAMERAS

(75) Inventors: Anthony Shafer, Novato, CA (US); Matthew Ward, Novato, CA (US)

(73) Assignee: Two Pic MC LLC, Burbank, CA (US)

( * ) Notice: Subject to any disclaimer, the term of this patent is extended or adjusted under 35 U.S.C. 154(b) by 1105 days.

(21) Appl. No.: 12/475,280

(22) Filed: May 29, 2009

(51) Int. Cl.
 G06T 13/00 (2011.01)
 G09G 5/00 (2006.01)
 G06K 9/00 (2006.01)
 G06F 17/00 (2006.01)
 G06F 3/00 (2006.01)
 G06T 11/40 (2006.01)

(52) U.S. Cl.
 CPC ..................................... G06T 11/40 (2013.01)

(58) Field of Classification Search
 None
 See application file for complete search history.

(56) References Cited

U.S. PATENT DOCUMENTS

| 2004/0100479 | A1* | 5/2004 | Nakano et al. | 345/700 |
| 2007/0052724 | A1* | 3/2007 | Graham et al. | 345/620 |
| 2009/0063118 | A1* | 3/2009 | Dachille et al. | 703/11 |
| 2010/0042923 | A1* | 2/2010 | Barcay et al. | 715/715 |
| 2010/0045703 | A1* | 2/2010 | Kornmann et al. | 345/653 |

\* cited by examiner

*Primary Examiner* — Tize Ma
(74) *Attorney, Agent, or Firm* — Kikpatrick Townsend & Stockton LLP

(57) ABSTRACT

A method for a computer system includes displaying a first plurality of images to a user on a display at a uniform rate wherein the images of the first plurality of images are determined in response to a first plurality of marks associated with a virtual camera location curve within a three-dimensional scene, receiving a plurality of user inputs from a user input device, while the user views the first plurality of images at the uniform rate, determining a second plurality of marks in response to the first plurality of marks associated with the curve and the plurality of user inputs, determining a second plurality of images in response to the second plurality of marks associated with the curve, storing the second plurality of marks associated with the curve in a memory, and displaying the second plurality of images to the user on the display at the uniform rate.

9 Claims, 6 Drawing Sheets

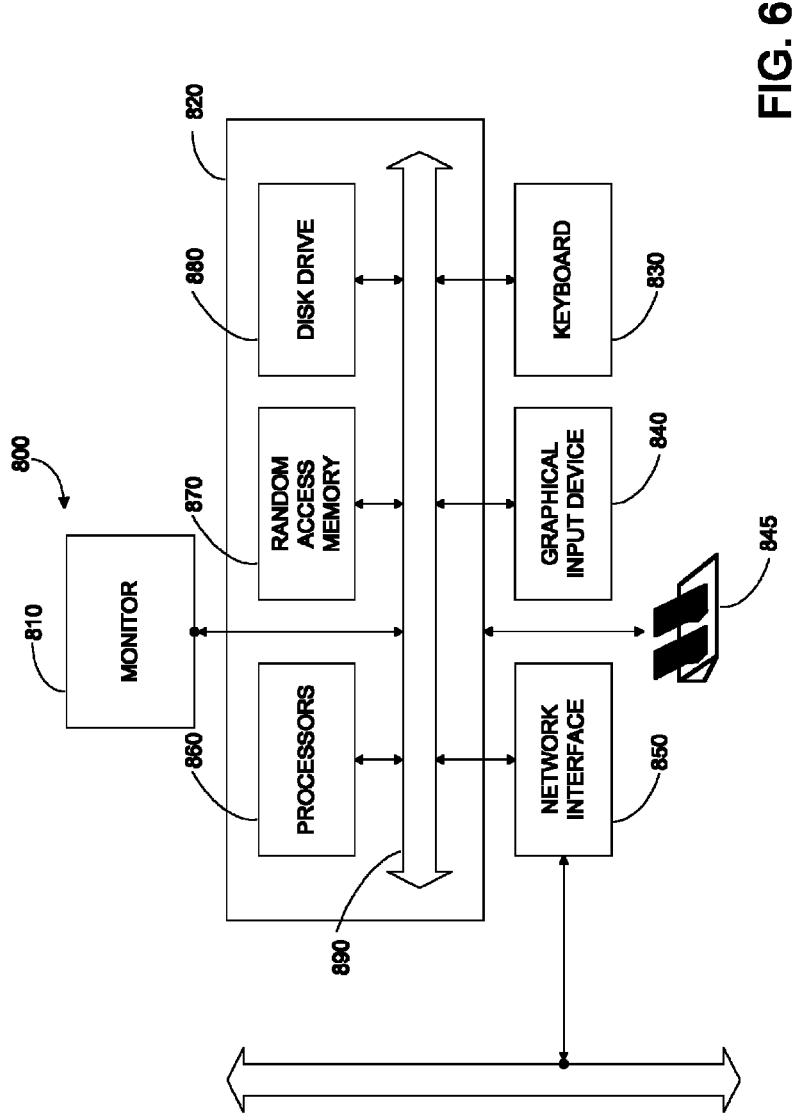

METHODS AND APPARATUS FOR INTERACTIVE USER CONTROL OF VIRTUAL CAMERAS

BACKGROUND OF THE INVENTION

Embodiments of the present invention relate to computer animation techniques. More specifically, embodiments of the present invention relate to methods and apparatus for modeling motion of a virtual camera within a scene.

The inventors of the present invention have determined that one problem with current computer animation techniques is placement of a camera (virtual camera) within a virtual environment (scene). More specifically, based upon the inventors' experience with CGI animation, the movement of a virtual camera within a scene is difficult to control. Typically positions of a virtual camera can be specified with one or more curves or splines within a CGI environment.

Limitations, determined by the inventors of the present invention, with curves or splines defining virtual camera placement includes that the rate of camera movement along such curves is typically, if not always, linear. Accordingly, users, such as a director of photography, or the like, cannot precisely control the camera location along the path with respect to time (e.g. for artistic reasons).

Another possible limitation is, even if the rate of movement of the camera could be adjusted along such paths, a technical user such as an animator, or the like, would have to mathematically adjust the rate of movement along the path according to the artistic direction of artistic users, such as a directory of photography. Such systems would be time-consuming and inefficient, as it would require an artistic user to attempt to explain to a technical user what is desired, have the technical user interpret the desires, have the artistic user view the results and give feedback to the technical user, etc.

In light of the above, methods and apparatus for modeling motion of a virtual camera within a scene is desirable, without the drawbacks discussed above.

BRIEF SUMMARY OF THE INVENTION

Embodiments of the present invention relate to methods and apparatus for modeling motion relative to a virtual object or objects. More specifically, various embodiments of the present invention include methods for accelerating and decelerating a virtual camera along defined a path via novel user interface devices. In various embodiments, the defined path may be modeled as a spline or curve.

Various embodiments of the present invention include providing an analog user interface device to the user that allows the user to modify the rate of movement of a virtual camera along a defined camera path. In various embodiments, the user interface device may allow the user to accelerate or decelerate the rate of movement of the virtual camera along the path. In some exemplary embodiments, the user interface may include one or more joysticks, knobs, or the like. In such examples, a displacement or rotation in of the device one direction accelerates the movement of the virtual camera, and/or displacement or rotation in another direction decelerates the movement of the virtual camera; a displacement or rotation of a first device accelerates the movement, and a displacement or rotation of a second device decelerates the movement. In other exemplary embodiments, the user interface may include foot controlled devices, where one pedal specifies an amount of acceleration, and another pedal specifies an amount of deceleration; where a first orientation of a pedal specifies acceleration, and a second orientation of a pedal specifies deceleration, or the like.

As disclosed herein, in various embodiments, the analog input into the user interface device is typically converted into digital signals and then provided as input to a computer system. Subsequently, the digital signals are interpreted as acceleration and/or deceleration commands for the camera along the path. In response to such commands, the position of the virtual camera along the defined path is determined with respect to time. High quality images may subsequently be rendered based upon the position of the virtual camera with respect to time.

Various embodiments of the present invention may utilize a computer system for modeling motion of the virtual camera relative to a virtual object within the computer animation environment. A computer system may include a memory configured to store sequences of images, fixed and removable storage devices for storing a sequence of images, instructions for executing embodiments of the present invention, and a display system for outputting images to a user.

According to one aspect of the invention, a method for a computer system is described. One technique includes displaying a first plurality of images to a user at a uniform rate wherein the images of the first plurality of images are determined in response to a first plurality of marks associated with a curve associated with a virtual camera location within a three-dimensional scene, and receiving a plurality of user inputs from a user input device, while the user views the first plurality of images at the uniform rate. A process may include determining a second plurality of marks in response to the first plurality of marks associated with the curve and the plurality of user inputs, and determining a second plurality of images in response to the second plurality of marks associated with the curve. A method may include storing the second plurality of images, and displaying the second plurality of images to the user at the uniform rate.

According to one aspect of the invention, a method for a computer system including processor, a memory, and a display is described. One technique includes rendering an initial virtual camera image in the processor in response to an initial position for a virtual camera along a specified virtual camera path, and displaying the initial virtual camera image to the user on the display associated with the computer system. A process may include receiving a plurality of user inputs on a user input device associated with the computer system by a viewer viewing the initial virtual camera image, determining a plurality of positions for the virtual camera along the specified virtual camera path in the processor in response the plurality of user inputs, and rendering a first plurality of virtual camera images in the processor in response to the plurality of positions. Operations may include displaying the first plurality of virtual camera images to the user on the display, storing the plurality of positions for the virtual camera along the specified virtual camera path in the memory, and rendering a second plurality of virtual camera images in the processor in response to the plurality of positions stored in the memory, wherein a quality of the second plurality of virtual camera images is higher than a quality of the first plurality of virtual camera images.

According to yet another aspect of the invention a computer system for rendering images is disclosed. One apparatus includes a processor configured to render an initial virtual camera image in the processor in response to an initial position for a virtual camera along a specified virtual camera path, configured to receive a plurality of user inputs on a user input device associated with the computer system by a viewer viewing the initial virtual camera image, configured to determine a plurality of positions for the virtual camera along the specified virtual camera path in the processor in response the plurality of user input, and configured to render a first plurality of virtual camera images in the processor in response to the plurality of positions. A device may include a display coupled to the processor, wherein the display is configured to display the initial virtual camera image to the user associated with the computer system, and configured to display the first plurality of virtual camera images to the user, and a memory coupled to the processor, wherein the memory is configured to store the plurality of positions for the virtual camera along the specified virtual camera path in the memory. In various embodiments, the processor is also configured to render a second plurality of virtual camera images in the processor in response to the plurality of positions stored in the memory, wherein a quality of the second plurality of virtual camera images is higher than a quality of the first plurality of virtual camera images. The tangible medium may include optical storage media (e.g. DVD, CD-ROM, Blu-Ray), magnetic storage media (e.g. hard disk), semiconductor storage media (RAM, flash memory), or the like

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 6 illustrates a commuter system according to various embodiments of the present invention.

DETAILED DESCRIPTION OF THE INVENTION

Figure 1:
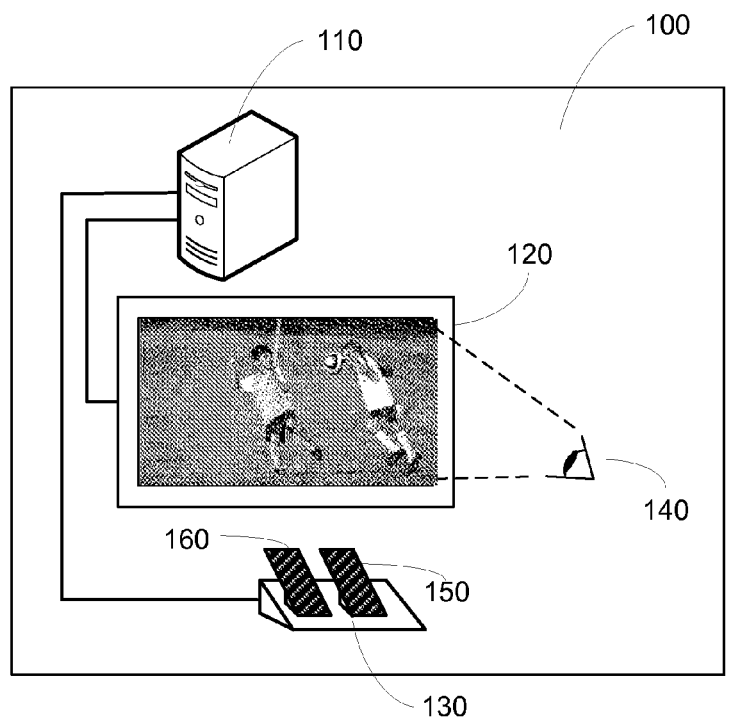
FIG. 1 illustrates a block diagram of a computer system according to various embodiments of the present invention.

FIG. 1 is an overview of an embodiment of the present invention. In the example in FIG. 1, a system 100 is illustrated including a computer system 110 including a user display 120, and a user input device 130. In various embodiments of the present invention, user input device 130 may embodied as one or more joysticks, knobs, switches, pedals, or the like.

In the example in FIG. 1, user input device 130 includes two pedals two pedals 150 and 160 that are operated independently by feet of a user 140. For example, pedals 150 and 160 may resemble gas and brake pedals of a driving simulator, and the user may independently depress pedal 150 with respect to pedal 160. In such examples, when pedals 150 or 160 are depressed, signals indicating such are provided to computer system 110.

In other embodiments of the present invention, pedals 150 and 160 may be linked together such as rudder control pedals of a flight simulator, and when the user pushes pedal 150 forward from a neutral position and pedal 160 moves rearward from the neutral position, and vice versa. In such examples, when a pedal is advanced forward from a neutral position, signals indicating such are provided to computer system 110. Similarly, in other embodiments of the present invention, a single pedal may be provided, where depressing a pedal is similar to the user depressing pedal 150, and releasing the pedal is similar to the user depressing pedal 160. In such embodiments, a neutral position may be achieved by pressing the pedal about half-way down, or the like.

In light of the present patent disclosure, one of ordinary skill in the art will understand that many other hardware configurations are suitable for use with the present invention. For example, the user input device 130 may include a computer pointing device such as a mouse, a trackball, a track pad, a joystick, a drawing tablet, rotating knobs, slider switches, or the like from manufacturers such as Microsoft, Logitech, MadCatz, or the like. In various embodiments, the analog user input, e.g. the user depressing of a pedal, turning of a knob, the user moving a joystick, or the like may be termed an "analog" user input. As disclosed herein, the analog user input is converted in to digital signals and provided to computer system 110 as user input. In various embodiments of the present invention, the digital signals may be provided to computer system 110 via a wire interface, such as USB; a wireless interface, such as Bluetooth, 900 MHz, Gigahertz communication, or the like. In various embodiments, these user input devices may include force feedback capability, and provide physical feedback to users, depending upon various embodiments of the present invention.

In the example in FIG. 1, computer system 110 outputs a series of images to display 120 for viewing by viewer 140. In various embodiments of the present invention, as will be discussed further below, the series of images represents scenes captured by a virtual camera within a computer generated environment. More specifically, the series of images represents images "captured" by a virtual camera as the virtual camera moves in the scene, with respect to time.

In various embodiments of the present invention, the series of virtual camera images are displayed on display 120 and viewed by user 140. In typical embodiments, user 140 may be a lead director of a feature, a director of photography, a director of cinematography, or the like. As user 140 views the series of images, user 140 may provide input signals via user input device 130. These input signals are typically inspired by the artistic abilities, i.e. artistic eye, of user 140, as will be described below. In response to the input signals, computer system 110 computes another series of images, again representing what the virtual camera records within the scene, with respect to time. The process then continues until user 140 is satisfied.

Figure 2:
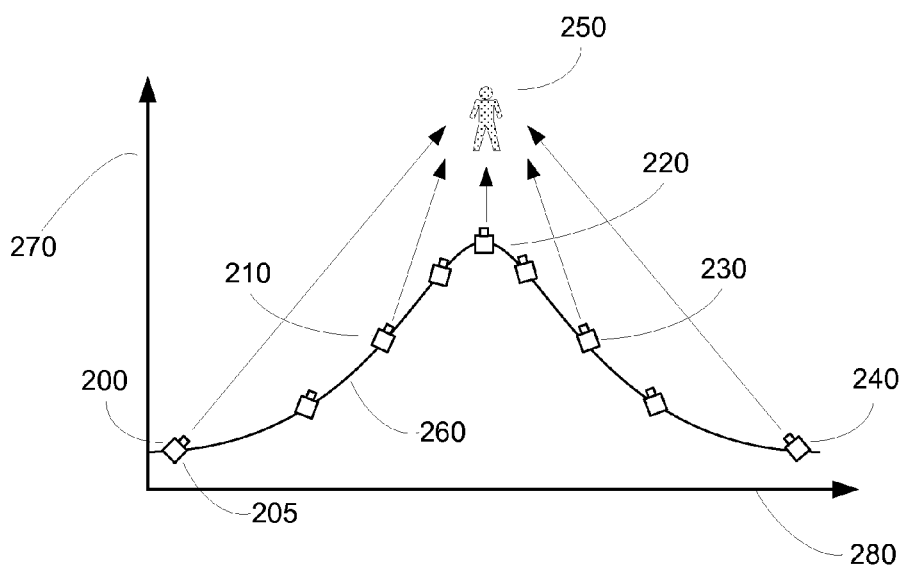
FIG. 2 illustrates an example according to various embodiments of the present invention.

FIG. 2 illustrates an example according to various embodiments of the present invention. More specifically, FIG. 2 illustrates positions of a virtual camera 205 at various positions 200-240 along a virtual camera path 260. Additional camera parameters, not shown, can be specified such that virtual camera 205 is pointed to object 250, or other objects, for example, in the scene while virtual camera 205 moves along virtual camera path 260.

In FIG. 2, positions 200-240 represent exemplary positions of virtual camera 205 along virtual camera path 260 with respect to time. In various embodiments of the present invention, a first axis 270 and a second axis 280 are shown representing a plane of movement for virtual camera path 260 and for virtual camera 205. However, other embodiments may include a third axis for virtual camera path 260 and for virtual camera 205. As merely an example, virtual camera path 26 may resemble a cork-screw path, or the like.

Figure 3A:
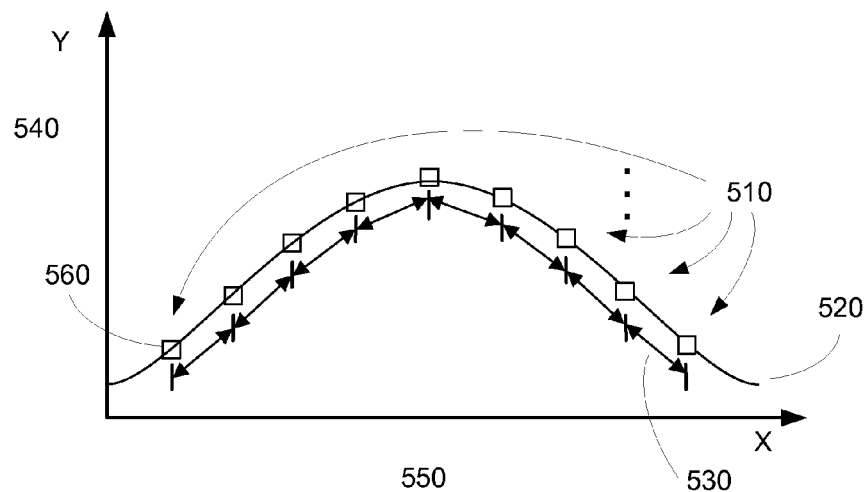
FIG. 3A-B illustrate an example according to various embodiments of the present invention.
Figure 3B:
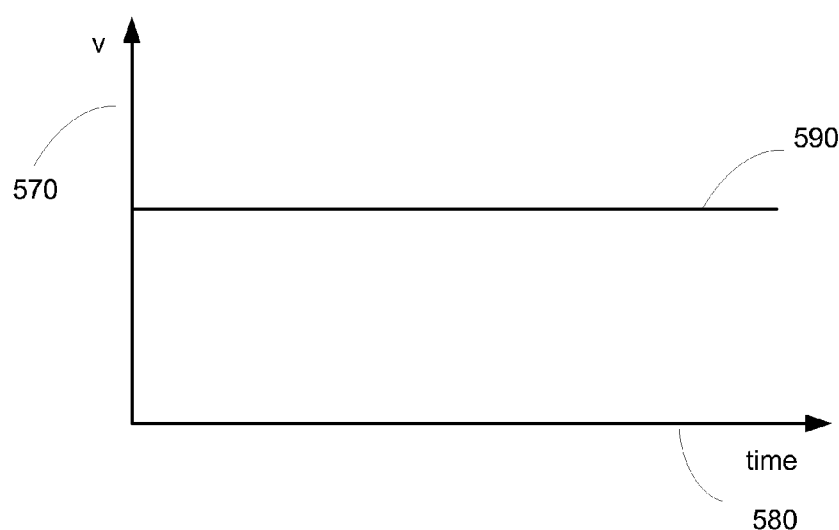

FIGS. 3A-B illustrate an example according to various embodiments of the present invention. In FIG. 3A, positions 510 represent positions of virtual camera 560 along virtual camera path 520 with respect to y-axis 540 and x-axis 550.

As illustrated in FIG. 3B, in a default example, the rate 570 of virtual camera 560 along virtual camera path 520 is shown to be uniform with respect to time 580, as indicated at 590. Accordingly, the observed distances 530 between positions 510 along path 520 are approximately equal in FIG. 3A. FIGS. 3A-B illustrate a two-dimensional example, and as described above, and other embodiments may include three-dimensional camera paths.

In various embodiments, images taken by virtual camera 560 are rendered by computer system 110 at a rate matching film rate, e.g. 24 frames per second (fps), or at any other rate, e.g. 30 fps, 60 fps, 10 fps, or the like. As an example, if the frame rate of the present example is 24 fps, positions 510 represent the positions of virtual camera 560 every $24^{th}$ of a second apart. In various embodiments, the images rendered at positions 510 are displayed to a user, at the same frame rate, e.g. 24 fps, at a slower rate (e.g. slow motion), or at a faster rate.

Figure 4A:
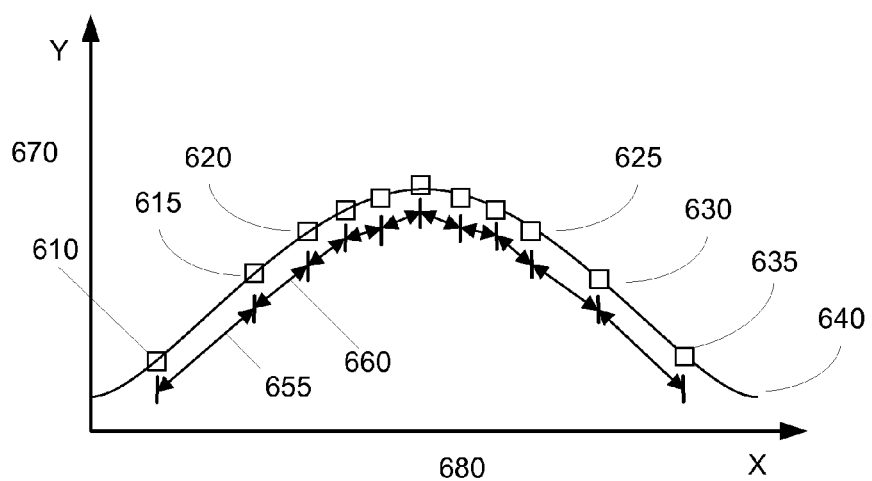
FIG. 4A-B illustrate another example according to various embodiments of the present invention.
Figure 4B:
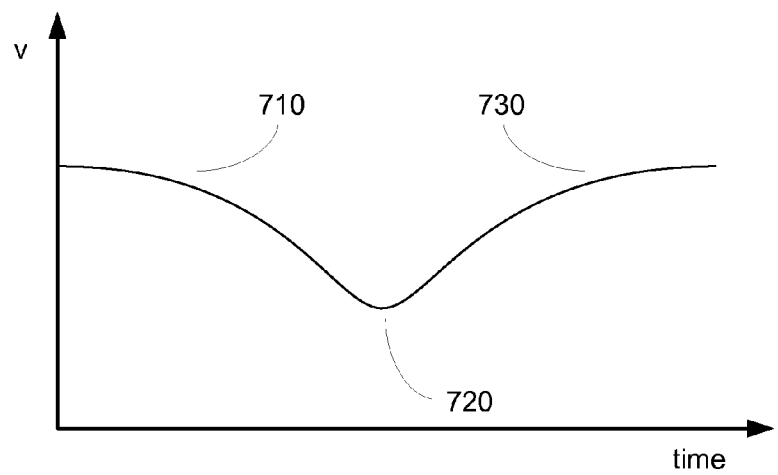

FIGS. 4A-B illustrate an example according to various embodiments of the present invention. More specifically, FIGS. 4A-B illustrate results derived based upon the inputs provided by a user using the user input devices described above. In FIG. 4A, positions 610-635 represent modified positions of virtual camera 550 along virtual camera path 640 with respect to y-axis 670 and x-axis 680.

As illustrated in FIG. 4B, the velocity of virtual camera 550 along virtual camera path 520 has been modified by the user with respect to time. More specifically, in region 710, the user has specified that the velocity of camera 550 along path 640 decreases until 720, and then the user has specified that the velocity of camera 550 along path 640 increases in region 730. As a result, the observed distances between positions 610 and 615, as indicated at 655, is larger than the distance between position 615 and 620, as indicated at 660.

In various embodiments, images taken by virtual camera 605 will also be rendered by computer system 110, or other rendering system, at a rate matching film rate, e.g. 24 frames per second (fps), or at any other rate, e.g. 30 fps, 60 fps, 10 fps, or the like. In this example, if the frame rate of the present example is 24 fps, positions 610-635 represent the positions of virtual camera 605 every $24^{th}$ of a second apart. In various embodiments, images rendered at positions 610-635 are also displayed to a user, at the same frame rate, e.g. 24 fps, at a slower rate (e.g. slow motion), or at a faster rate.

As can be seen by comparing the examples in FIG. 3A and FIG. 4A, the positions of the virtual camera along camera path can be precisely modified using intuitive user-input controls in various embodiments of the present invention.

Figure 5A:
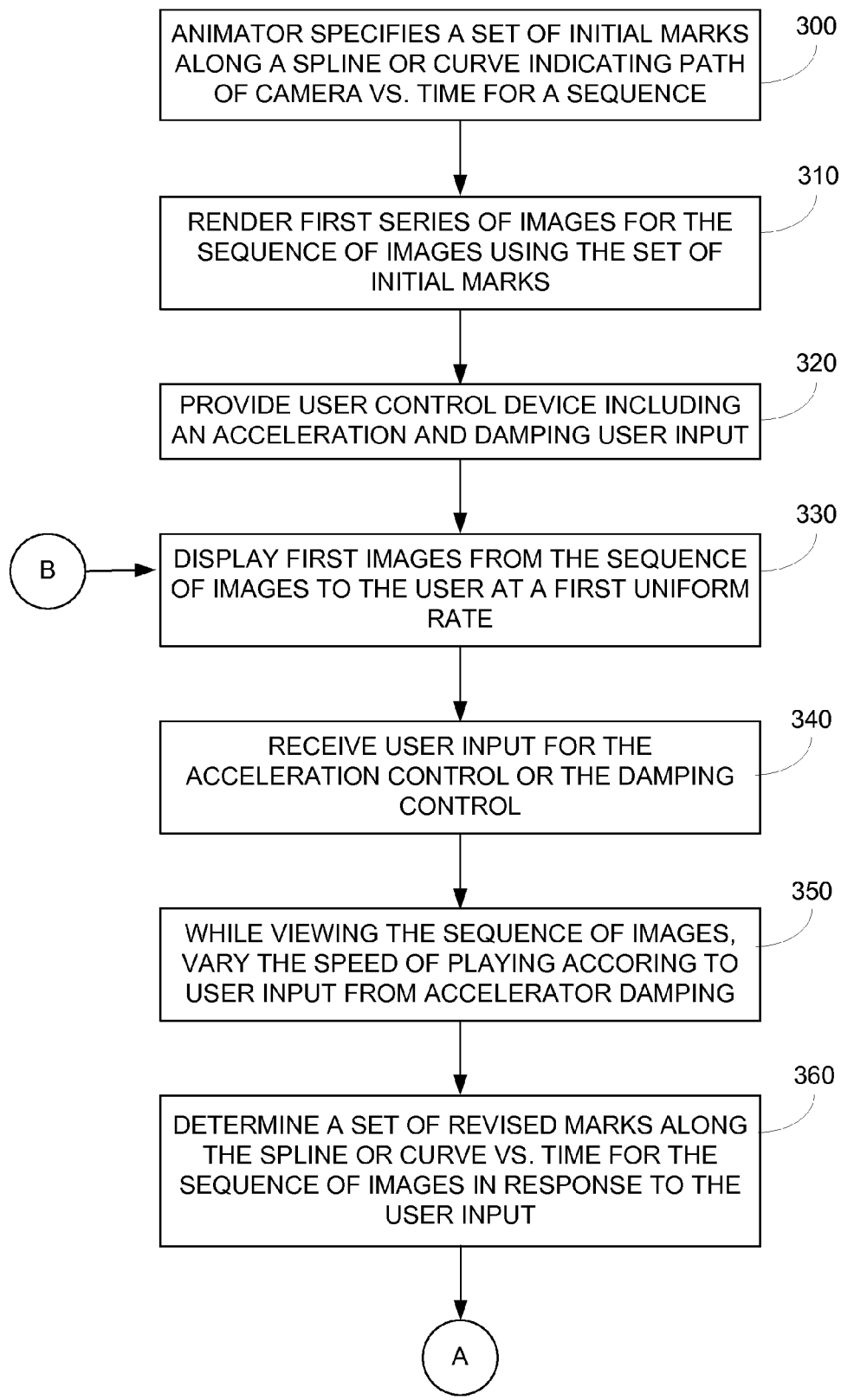
FIGS. 5A-B illustrate a flow diagram of various embodiments of the present invention.
Figure 5B:
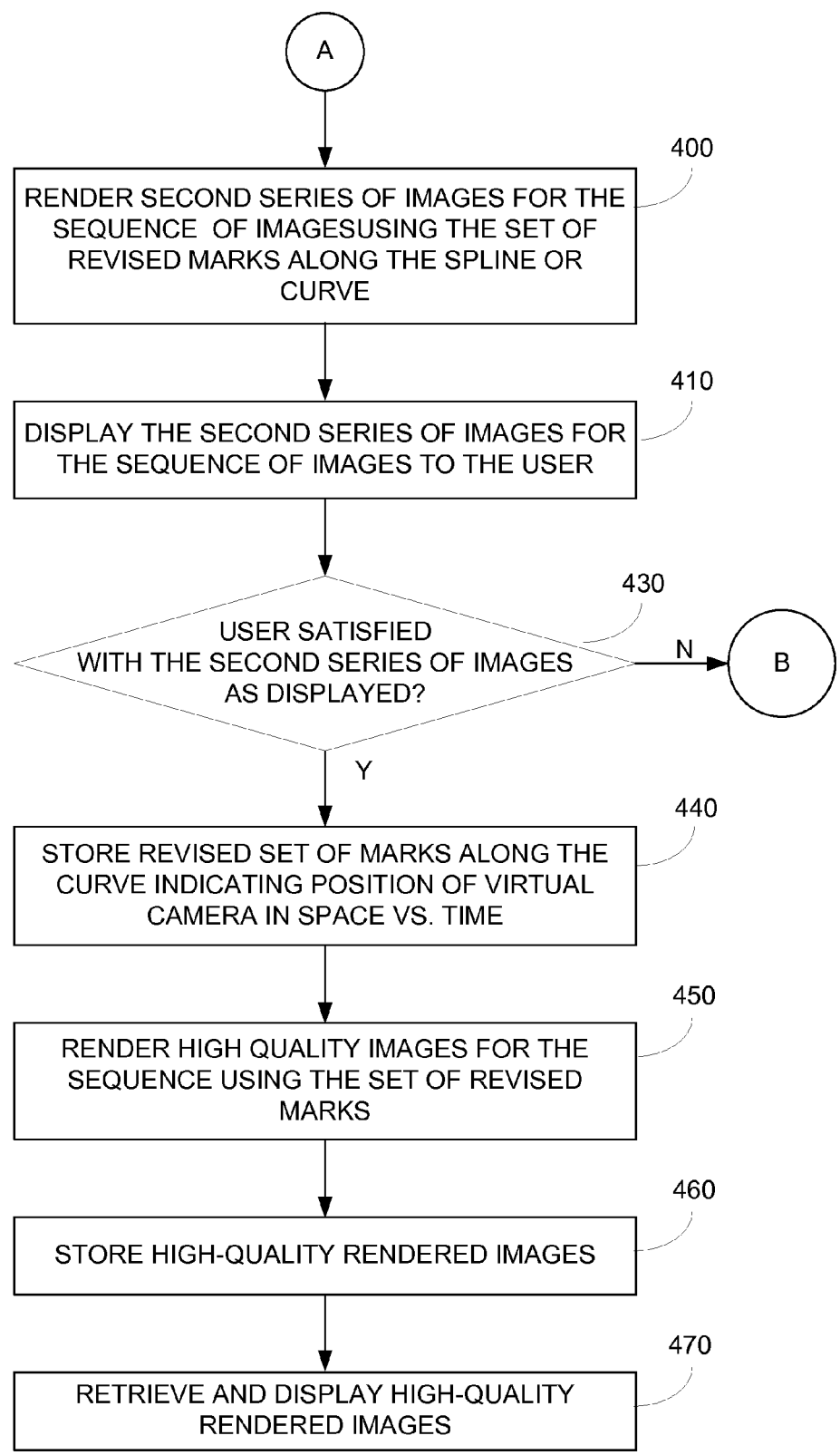

FIGS. 5A-B illustrate a flow diagram according various embodiments of the present invention. References will be made to FIGS. 3A-B and FIGS. 4A-B for sake of convenience.

Initially, a user, such as an animator, defines path 520 (e.g. a spline, curve, etc) for a position of virtual camera 560 in a scene, step 300. In various embodiments, the animator receives instructions from another user such as a director of photography, or the like, regarding positioning and timing of virtual camera 560. In response, the animator typically uses these instructions to define path 520 and speed 565.

As was illustrated in FIG. 3B, speed 565 is typically assumed to be initially linear over path 520, thus positions 510 appear uniformly spaced on path 520.

Next, in various embodiments of the present invention, an initial series of images may be rendered of the scene based upon virtual camera 560 being positioned at positions 510, step 310. In various embodiments, the quality of rendering may vary depending upon specific requirements. For example, in some embodiments, the rendering may generate simple wire-frame objects; in some embodiments, the rendering may be a high-quality rendering including lighting and shading models; or the like. In various embodiments, any number of rendering or visualization software packages such as Maya or Renderman may be used.

In various embodiments of the present invention, a user, such as a directory of photography, cinematography, or the like, is provided with a computer system, with which to view the series of images, step 320. The computer system is provided with a user input device, as described in FIG. 1, such as foot pedals, a joystick, knobs, or the like. In various embodiments, the user input device allows the user to specify input to the computer system. In various embodiments, the initial series of images may be rendered upon this computer system, or the initial series of images may be rendered upon a different computer system and transferred to this computer system.

Next, the initial series of images are displayed to the user on a display, step 330. In various embodiments, the images may be displayed to the user at a uniform frame rate. In other words, the series of images may be rendered at a rate of 24 fps, and the series of images may be played at a constant output of 24 fps. In other embodiments, the display rate may be different from the frame rate, for example, 10 fps (e.g. slow motion), or the like. In various embodiments, the series of images may be looped and played over and over, according to the wishes of the user.

While viewing the initial (or first) series of images, the user (e.g. director) may provide user inputs using the user input devices, step 340. In various embodiments, the user input represents either an acceleration or a damping factor for the rate of movement of the virtual camera. In other words, based upon viewing the series of images, the director may artistically determine that the camera should linger at one position on the virtual camera path, but should not linger at another position. In various example, to provide such input, a user may depress one foot pedal to specify acceleration, and may depress another foot pedal to specify deceleration along the camera path; or to provide such input the user may push a joystick forward to specify acceleration and pull a joystick backwards to specify deceleration; or the like.

In various embodiments, various force feedback mechanisms may be provided to the user via the user input device. For example, a force resistance of a pedal, such as pedal 150 or 160, may increase depending upon the "speed" of virtual camera through the scene; a force resistance of a joystick may also vary according to the speed of movement through a scene; a user input device may rumble as a rate of deceleration increases; or the like.

As an initial visual feedback to the user input, the initial series of images may be displayed to the user at a non-uniform frame rate, step 350. As an example, in response to the user input, the initial images associated with the portion of the virtual path where the user specifies a deceleration may be output at a rate slower than the frame rate. For instance, if the initial series of images has a frame rate of 30 fps, based upon the user input, certain frames may be displayed at a rate of 1 fps. Additionally, in portions of the path where the user specifies an acceleration, frames may be output at a rate faster than the frame rate, or frames may be dropped to maintain the frame rate.

As a result of the user input, the duration of the playback of the initial series of images may also vary. As an example, if the initial series of images is initially associated with 192 rendered images and a frame rate of 24 fps, and the initial playback duration is approximately 8 seconds. However, in one example, if the user only specifies a deceleration along the virtual camera path, the 192 rendered images may then have a playback duration of 10 seconds, 12 seconds, or the like; in another example, if the user only specifies an acceleration along the virtual camera path, the 192 rendered images may then have a playback duration of 7 seconds, 6 seconds, or the like. Accordingly, the playback duration of the initial series of images may vary from the initial playback duration. An example of the variance in rate of movement of a virtual camera along a virtual camera path are illustrated in FIG. 4B.

Next, in various embodiments of the present invention, in response to the user inputs in step 340, a series of positions or timing marks are determined on the virtual camera path, step 360. These positions represent revised positions of the virtual camera for rendering purposes. As illustrated in the example in FIG. 3A, virtual camera positions 510 are revised to virtual camera positions 610-634 in FIG. 4A, based upon the revised velocity illustrated in FIG. 4B. As discussed above, the number of revised virtual camera positions may increase or decrease, depending upon the user input. For example, the number of revised virtual camera positions may increase when the user decelerates the camera, or the like.

Subsequently, a revised (a second) series of images may be rendered of the scene based upon virtual camera 605 being positioned at positions 610-635, step 370. As mentioned above, the quality of rendering may vary depending upon specific requirements. For example, in some embodiments, the rendering may generate simple wire-frame objects; in some embodiments, the rendering may be a high-quality rendering including lighting and shading models; or the like.

In various embodiments, the revised series of images are then displayed to the user on a display, typically at a uniform frame rate, step 410. In other embodiments, the display rate may be different from the frame rate, e.g. slow motion, or the like. In various embodiments, the series of images may be looped and played over and over, according to the wishes of the user.

As illustrated in FIG. 5B, if the user is artistically satisfied with the scene represented by the revised series of images, step 430, the revised series of positions along the virtual camera path determined in step 360 is associated with the virtual camera path, and stored in memory, step 440.

Subsequently, higher-quality renderings of the scene may be performed using the revised series of virtual camera positions, step 450. In various embodiments, higher quality renderings may refer to higher image resolution, larger number of rendering parameters (e.g. inclusion or exclusion of shading models, lighting models, camera models, etc.), use of different level of detail objects in a scene (e.g. high detail object model versus a low detail object model), rendering at higher or lower frame rates, and the like.

These images may be stored onto a tangible medium such as an optical medium (e.g., DVD, Blu-Ray), onto a semiconductor medium (e.g., ROM, flash memory), onto a magnetic medium (e.g. disk drive), onto a film medium, or the like, step 460. Subsequently, the images may be retrieved from the tangible storage medium and output to a user, e.g. theater audience, home user, etc., step 470.

In various embodiments, the process described above may be repeated by displaying the revised (or second) series of images to the user in step 330, until the user is satisfied, in step 430.

FIG. 6 is a block diagram of typical computer system 800 according to various embodiment of the present invention. In various embodiments, computer system 800 typically includes a monitor 810, computer 820, a keyboard 830, a user input device 840, a network interface 850, and the like.

In the present embodiment, user input device 840 is typically embodied as a computer mouse, a trackball, a track pad, wireless remote, and the like. User input device 840 typically allows a user to select objects, icons, text, control points and the like that appear on the monitor 810. In some embodiments, monitor 810 and user input device 840 may be integrated, such as with a touch screen display or pen based display such as a Cintiq marketed by Wacom. Embodiments of user input devices are illustrated as pedals 845. However, as described above, any other such device, such as a joystick, may be used.

Embodiments of network interface 850 typically include an Ethernet card, a modem (telephone, satellite, cable, ISDN), (asynchronous) digital subscriber line (DSL) unit, and the like. Network interface 850 are typically coupled to a computer network as shown. In other embodiments, network interface 850 may be physically integrated on the motherboard of computer 820, may be a software program, such as soft DSL, or the like.

Computer 820 typically includes familiar computer components such as a processor 860, and memory storage devices, such as a random access memory (RAM) 870, disk drives 880, and system bus 890 interconnecting the above components.

In one embodiment, computer 820 is a PC compatible computer having multiple microprocessors such as Xeon™ microprocessor from Intel Corporation. Further, in the present embodiment, computer 820 typically includes a UNIX-based operating system.

RAM 870 and disk drive 880 are examples of tangible media for storage of animation asset data, audio/video files, computer programs, operating system, embodiments of the present invention, including rendering engines, program code, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 6 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

In light of the above disclosure, one of ordinary skill in the art would recognize that many variations may be implemented based upon the discussed embodiments. For example, in various embodiments, various steps described above, such as steps 320-330, need not be performed when the computer system is capable of real-time rendering. In such cases, the user, e.g. directory of photography can, in real-time, control the position of the virtual camera along the path and see the images from those camera positions. In various embodiments, the virtual camera may be positioned along the virtual camera path (e.g. at one end), and the position of the virtual camera does not change until the user accelerates the virtual camera. Then as the user accelerates the virtual camera or decelerates the virtual camera along the virtual camera path, the revised series of positions of step 360 may be recorded, and the series of images of step 370 may be rendered in real-time in step 400 and displayed to the user in real-time in step 410.

In other embodiments, the user may be given additional controls to control additional positional parameters of the virtual camera. For example, the user may intuitively specify a height (z-axis) of the virtual camera within the scene, and the user may freely specify a position (x-axis, y-axis) and path of the virtual camera within the scene. In other words, in some embodiments, the virtual camera need not be locked to any spline, as discussed above. In such cases, it is envisioned that some level of rendering or visualization of the virtual camera image may be performed in real-time, for the benefit of the user. Accordingly, the user may specify and view a virtual camera path, in real-time, and that virtual camera path may also be modified, as described above.

In other embodiments, the user may be given additional controls to control or revise other parameters of the virtual camera. For example, the user may specify the direction of the virtual camera, the focal length of the virtual camera, etc. In some embodiments, the rendering of the revised series of images, based upon the revised virtual camera parameters, may be performed in real-time or non-real-time, based upon specific user image quality requirements, as was mentioned above.

It should be understood that "rendering" may refer to a high quality process of converting an image from a mathematical description of a scene using a program such as Pixar's RenderMan®. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   one or more processors;
   a display communicatively coupled to at least one of the one or more processors, the display configured to display a plurality of previously determined images corresponding to a first plurality of specified positions of a virtual camera along a virtual camera path, wherein different images of the plurality of previously determined images correspond to different positions of the virtual camera path;
   a memory communicatively coupled to at least one of the one or more processors, the memory configured to store the virtual camera path;
   an analog, hardware user input device coupled to at least one of the one or more processors, the user input device configured to receive an input of desired rates that increase or decrease a display rate of the plurality of previously determined images relative to a default rate, the desired rates corresponding to a movement of the virtual camera at different times along the virtual camera path, wherein the input is received when the plurality of previously determined images are displayed; and
   wherein the one or more processors are configured to:
      determine a second set of positions along the virtual camera path based on the desired rates of display of the plurality of previously determined images at the different times along the virtual camera path, wherein at least one position of the first set of positions along the virtual camera path is not a position of the second set of positions along the virtual camera path; and
      after determining the second set of positions, render a revised plurality of images using the second set of positions along the virtual camera path.

2. The system of claim 1, wherein the analog, hardware user input device includes at least one of a foot pedal, a knob, or a joystick.

3. The system of claim 1, wherein the analog, hardware user input device includes a first element configured to receive input corresponding to a virtual camera acceleration and a second element configured to receive input corresponding to a virtual camera deceleration.

4. The system of claim 1, wherein at least one element of the analog, hardware user input device provides a force resistance associated with the motion of the virtual camera along the virtual camera path.

5. The system of claim 1, wherein the virtual camera virtual camera path is a user-defined spline.

6. A computer-implemented method, comprising:
   storing, by a memory communicatively coupled to one or more processors, a virtual camera path;
   displaying, by a display communicatively coupled to the one or more processors, a plurality of previously determined images corresponding to a first plurality of specified positions of a virtual camera along the virtual camera path, wherein different images of the plurality of previously determined images correspond to different positions of the virtual camera path;
   receiving, by an analog, hardware user input device coupled to the one or more processors, an input corresponding to desired rates that increase or decrease a display rate of the plurality of previously determined images relative to a default rate, the desired rates corresponding to a movement of the virtual camera at different times along the virtual camera path, wherein the input is received when the plurality of previously determined images are displayed;
   determining a second set of positions along the virtual camera path based on the desired rates of display of the plurality of previously determined images at the different times along the virtual camera path, wherein at least one position of the first set of positions along the virtual camera path is not a position of the second set of positions along the virtual camera path; and after determining the second set of positions, rendering a revised plurality of images using the second set of positions along the virtual camera path.

7. The method of claim 6, further comprising receiving input corresponding to a virtual camera acceleration with a first element of the user input device and receiving input corresponding to a virtual camera deceleration with a second element of the user input device.

8. The method of claim 6, further comprising providing a force resistance associated with the motion of the virtual camera along the virtual camera path.

9. The method of claim 6, wherein the virtual camera path is a user-defined spline.

* * * * *

UNITED STATES PATENT AND TRADEMARK OFFICE
CERTIFICATE OF CORRECTION

| | | |
|---|---|---|
| PATENT NO. | : 9,007,379 B1 | Page 1 of 1 |
| APPLICATION NO. | : 12/475280 | |
| DATED | : April 14, 2015 | |
| INVENTOR(S) | : Anthony Shafer and Matthew Ward | |

It is certified that error appears in the above-identified patent and that said Letters Patent is hereby corrected as shown below:

On the title page

Item (74), subsection, Attorney, Agent or Firm.

Please delete "Kikpatrick Townsend Stockton LLP"; and
    Please insert --Kilpatrick Townsend Stockton LLP--;

In the Claims

At column 10, Claim 5, line 40-41:

Please delete the second instance of "virtual camera" so that the line reads,
    "The system of claim 1, wherein the virtual camera path is a user-defined spline"

Signed and Sealed this
Twenty-eighth Day of July, 2015

Michelle K. Lee
*Director of the United States Patent and Trademark Office*